US011628526B2

(12) United States Patent
Lin

(10) Patent No.: US 11,628,526 B2
(45) Date of Patent: Apr. 18, 2023

(54) MACHINE TOOL FOR CYLINDRICAL WORKPIECES

(71) Applicant: L & L MACHINERY INDUSTRY CO., LTD., Taichung (TW)

(72) Inventor: Chien Yu Lin, Taichung (TW)

(73) Assignee: L & L MACHINERY INDUSTRY CO., LTD., Taichung (TW)

( * ) Notice: Subject to any disclaimer, the term of this patent is extended or adjusted under 35 U.S.C. 154(b) by 206 days.

(21) Appl. No.: 17/216,816

(22) Filed: Mar. 30, 2021

(65) Prior Publication Data

US 2022/0314380 A1 Oct. 6, 2022

(51) Int. Cl.
| | |
|---|---|
| *B23B 17/00* | (2006.01) |
| *B23B 11/00* | (2006.01) |
| *B23P 23/02* | (2006.01) |
| *B23Q 1/76* | (2006.01) |
| *B23Q 1/01* | (2006.01) |

(Continued)

(52) U.S. Cl.
CPC .............. *B23Q 1/017* (2013.01); *B23B 3/065* (2013.01); *B23P 23/02* (2013.01); *B23Q 1/015* (2013.01); *B23Q 1/03* (2013.01); *B23Q 1/76* (2013.01); *B23Q 3/06* (2013.01); *B23Q 39/021* (2013.01); *B23Q 2039/008* (2013.01); *B23Q 2701/01* (2013.01); *Y10T 29/5112* (2015.01); *Y10T 29/5114* (2015.01)

(58) Field of Classification Search
CPC ... Y10T 29/5109–5114; Y10T 82/2524; Y10T 82/2543; Y10T 82/2566; B23B 3/065; B23B 3/162; B23B 3/165; B23B 11/00; B23B 3/164; B23Q 39/00–39/028; B23Q 37/00–37/007; B23Q 1/01–1/017; B23Q 2701/01
USPC ................... 29/27 R–27 C; 82/129, 138, 149
See application file for complete search history.

(56) References Cited

U.S. PATENT DOCUMENTS

| | | | | |
|---|---|---|---|---|
| 3,186,267 A | * | 6/1965 | Pabst ..................... | B23Q 11/08 82/149 |
| 3,534,643 A | * | 10/1970 | Markgraf ................ | B23Q 1/01 82/149 |

(Continued)

FOREIGN PATENT DOCUMENTS

| | | | |
|---|---|---|---|
| CN | 201960345 U | * | 9/2011 |
| CN | 204366053 U | * | 6/2015 |

(Continued)

*Primary Examiner* — Erica E Cadugan
(74) *Attorney, Agent, or Firm* — Alan D. Kamrath; Karin L. Williams; Mayer & Williams PC

(57) ABSTRACT

A complex machine tool for cylindrical workpieces has a bed, a headstock assembly, at least one supporting assembly, and at least one machining assembly. The bed has three tracks being respectively a first track, a second track, a third track arranged in order. Each one of the three tracks defines a respective guiding direction, and the three guiding directions of the three tracks are mutually parallel. The headstock assembly is connected to the bed, and is located near one of two ends of the second track. The at least one supporting assembly is mounted on one of the three tracks and is used for supporting the cylindrical workpiece. The at least one machining assembly is mounted on one of the three tracks, is slidable along the track, and is located on a position at a spaced interval from the at least one supporting assembly.

4 Claims, 11 Drawing Sheets

(51) Int. Cl.
*B23Q 39/02* (2006.01)
*B23Q 1/03* (2006.01)
*B23Q 3/06* (2006.01)
*B23B 3/06* (2006.01)
*B23Q 39/00* (2006.01)

(56) References Cited

U.S. PATENT DOCUMENTS

| | | | | |
|---|---|---|---|---|
| 3,691,879 A * | 9/1972 | Blake | | B23Q 7/045 |
| | | | | 82/127 |
| 4,545,271 A * | 10/1985 | Romi | | B23B 3/167 |
| | | | | 82/149 |
| 4,571,796 A * | 2/1986 | Sellner | | B23Q 3/15766 |
| | | | | 29/27 R |
| 5,052,089 A * | 10/1991 | Gadaud | | B23Q 1/01 |
| | | | | 82/149 |
| 5,078,556 A * | 1/1992 | Schrod | | B23B 5/18 |
| | | | | 409/269 |
| 6,185,818 B1 * | 2/2001 | Ito | | B23Q 1/76 |
| | | | | 29/889.7 |
| 6,626,075 B2 * | 9/2003 | Hirose | | B23Q 39/026 |
| | | | | 82/121 |
| 6,640,677 B2 * | 11/2003 | Ueda | | B23B 3/06 |
| | | | | 29/27 C |
| 6,732,618 B1 * | 5/2004 | Schreiber | | B23B 3/168 |
| | | | | 82/149 |
| 7,913,596 B2 * | 3/2011 | Hirose | | B23Q 1/76 |
| | | | | 82/159 |
| 2002/0066342 A1 * | 6/2002 | Baumann | | B23Q 39/026 |
| | | | | 82/117 |
| 2011/0225784 A1 * | 9/2011 | Li | | B23P 23/02 |
| | | | | 29/27 R |
| 2012/0213606 A1 * | 8/2012 | Tullmann | | B23Q 11/0067 |
| | | | | 409/137 |
| 2020/0070252 A1 * | 3/2020 | Passerini | | B23B 3/30 |

FOREIGN PATENT DOCUMENTS

| | | | |
|---|---|---|---|
| DE | 3824572 A1 | * | 1/1990 |
| GB | 904219 A | * | 8/1962 |
| JP | 2002-011637 A | * | 1/2002 |
| TW | M305071 U | * | 1/2007 |
| TW | M307465 U | * | 3/2007 |
| TW | I595957 B | * | 8/2017 |
| TW | M613356 U | * | 6/2021 |
| TW | 202220782 A | * | 6/2022 |

* cited by examiner

MACHINE TOOL FOR CYLINDRICAL WORKPIECES

BACKGROUND OF THE INVENTION

1. Field of the Invention

The present invention relates to a machine tool, and more particularly to a complex machine tool for cylindrical workpieces.

2. Description of Related Art

Traditional machine tools include a lathe, a miller, a grinder, and a boring machine, which respectively correspond to turning, milling, grinding, and boring processes. With the advancement of the industry, demand for complex machining rises. Nonetheless, the traditional machine tools cannot satisfy such demand, and a conventional complex machine tool is thereby gradually developed.

A conventional complex machine tool has a bed and multiple machining assemblies. The bed includes a headstock assembly for holding and driving a cylindrical workpiece to rotate, a tailstock assembly for supporting the cylindrical workpiece, and a track located on a side of the bed. The multiple machining assemblies are slidably mounted on the track. Each machining assembly has a tool, and the tools of different machining assemblies may be of different sorts, e.g. a turning tool, a milling tool, a grinding tool, or a boring tool, whereby an operator may choose different machining assemblies for different needs of machining. For instance, if a machining assembly for turning and a machining assembly for milling are installed on the track, the conventional complex machine tool is equipped for a complex machining of turning and milling.

However, each machining assembly has a tool post for holding the tool and electromechanical components for moving on the track. In this way, if three or more said machining assemblies are installed on the track, the multiple machining assemblies will interfere with each other. Hence, if three or more sorts of machining processes are applied to the cylindrical workpiece, two or more said conventional complex machine tools will be necessary.

To sum up, the conventional complex machine tool is only suitable for two machining processes among turning, milling, and grinding. If three or more machining processes are needed, two or more conventional complex machine tools are necessary, but multiple conventional complex machine tools consume a large volume of space in a factory. Furthermore, the workpiece has to be newly corrected when shifted from one to another conventional complex machine tool, and even if the workpiece is corrected, propagation of errors still accumulates and leads to low precision of manufacture.

SUMMARY OF THE INVENTION

To solve the problems of low spatial efficiency and low precision of products resulted from that multiple conventional complex machine tools are necessary for applying three or more machining processes, the present invention provides a complex machine tool for cylindrical workpieces for effectively mitigating the problems.

The complex machine tool for cylindrical workpieces includes:
a bed having
three tracks being respectively a first track, a second track, a third track in serial order, wherein the second track is located between the first track and the third track, each one of the three tracks defines a respective guiding direction, and the three guiding directions of the three tracks are mutually parallel;
a headstock assembly connected to the bed, located near one of two ends of the second track, and configured for holding a cylindrical workpiece;
at least one supporting assembly mounted on one of the first track, the second track, and the third track, and configured for supporting the cylindrical workpiece; and
at least one machining assembly mounted on one of the first track, the second track, and the third track, being slidable along the track, and located at a spaced interval from the at least one supporting assembly.

According to the above-mentioned technical features, through the three tracks of the bed, different supporting assemblies and different machining assemblies may be mounted on an appropriate one of the three tracks, so the present invention may be applied for demand on multiple machining processes. Further, such configuration effectively avoids the problem of interference which is caused by multiple machining assemblies mounted on the track of the conventional complex machine tool. Also, because the complex machine tool may solely complete multiple different machining processes, and the cylindrical workpiece need not be shifted to different complex machine tool, thus the number of machines in a factory may be reduced, spatial efficiency may be improved, and propagation of errors may be further avoided.

DETAILED DESCRIPTION OF THE PREFERRED EMBODIMENT

Figure 1:
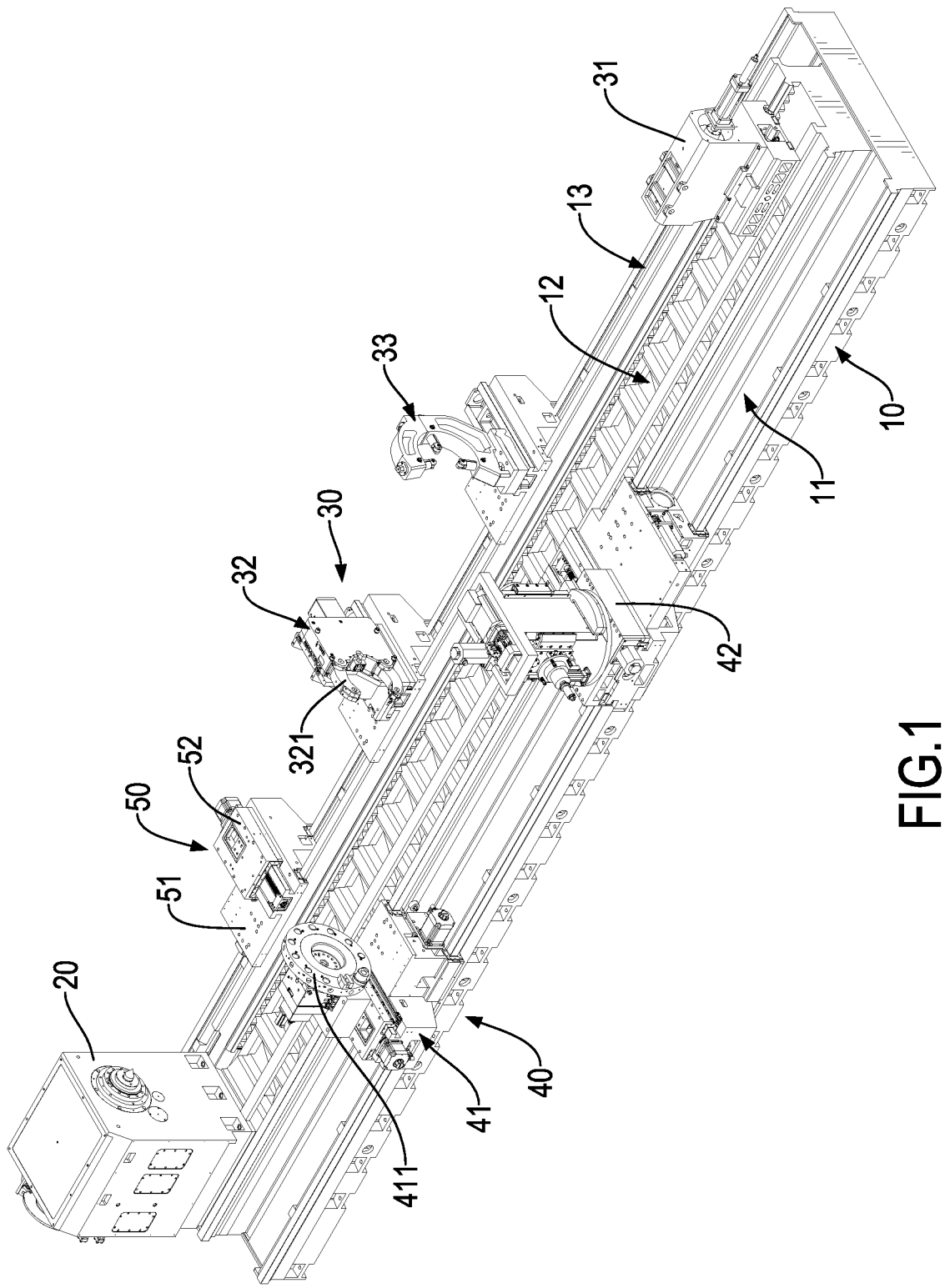
FIG. 1 is a perspective view of a complex machine tool for cylindrical workpieces in accordance with the present invention.
Figure 2:
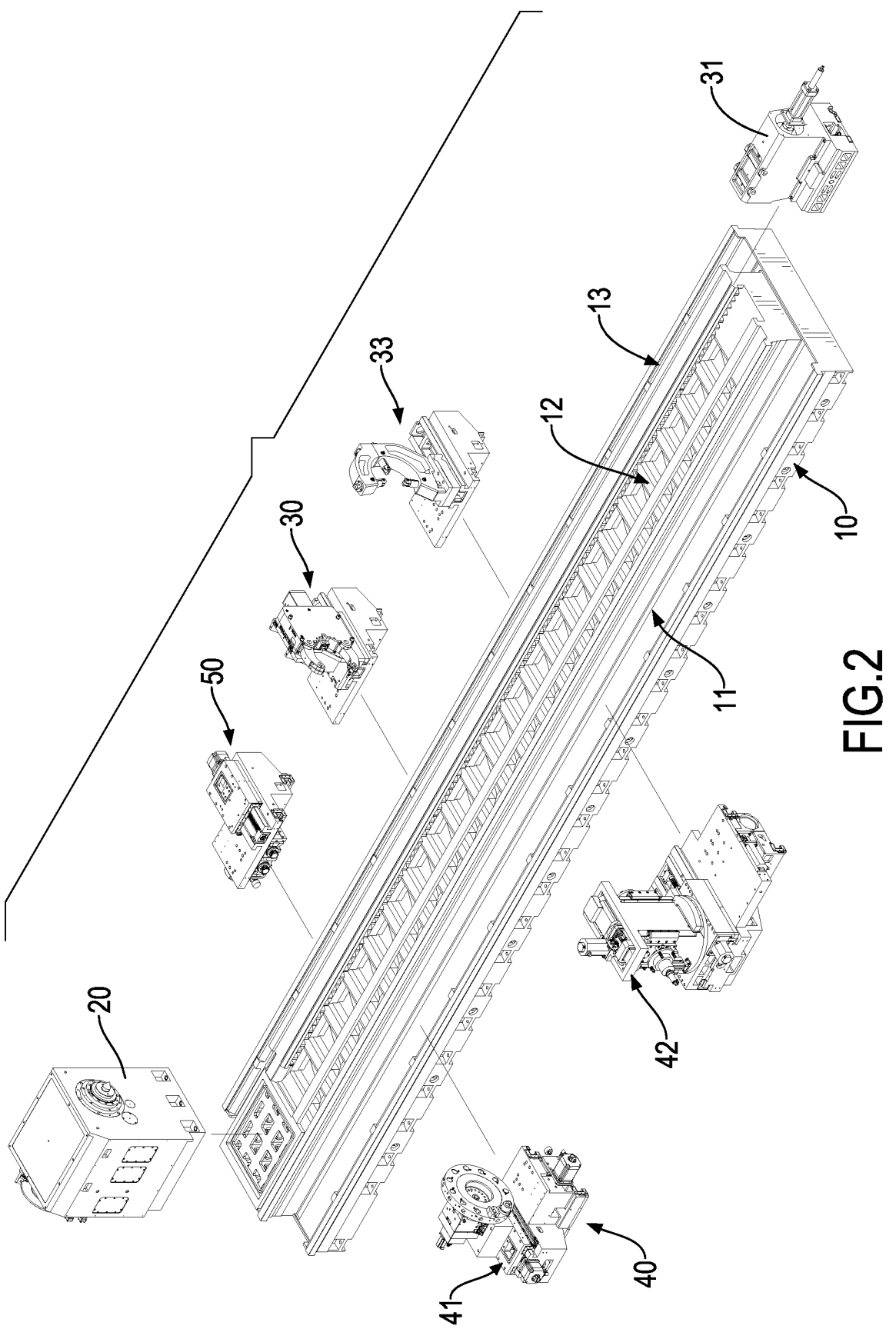
FIG. 2 is an exploded perspective view of the complex machine tool for cylindrical workpieces in FIG. 1.

In order to understand the technical features and practical effects of the present invention in detail, and to implement the present invention by following the content of the specification, the preferred embodiment shown in the drawings is further described in detail as follows.

With reference to FIGS. 1 to 4, a complex machine tool for cylindrical workpieces in accordance with the present invention comprises a bed 10, a headstock assembly 20, at least one supporting assembly 30, and at least one machining assembly 40, so as to process at least one sort of machining. Additionally, in the preferred embodiment of the present invention, the complex machine tool has three said supporting assemblies 30, two machining assemblies 40 for process multiple sorts of machining such as turning, milling, grinding, or boring, and a vacant carriage 50. Furthermore, the number of the supporting assemblies 30 and the machining assemblies 40 may be adjusted and selected upon demand. The vacant carriage 50 is used to installing another said supporting assembly 30 or another said machining assembly 40, and the number of the carriage 50 can be increased upon demand.

With reference to FIGS. 1, 3, 7, and 8, the bed 10 has three tracks, respectively a first track 11, a second track 12, and a third track 13 in serial order, wherein the second track 12 is located between the first track 11 and the third track 13. Each of the three tracks 11, 12, 13 has a respective guiding direction D1, D2, D3, and the three guiding directions D1, D2, D3 are mutually parallel. Also, each one of the three tracks 11, 12, 13 has two respective rails 111, 121, 131.

Figure 8:
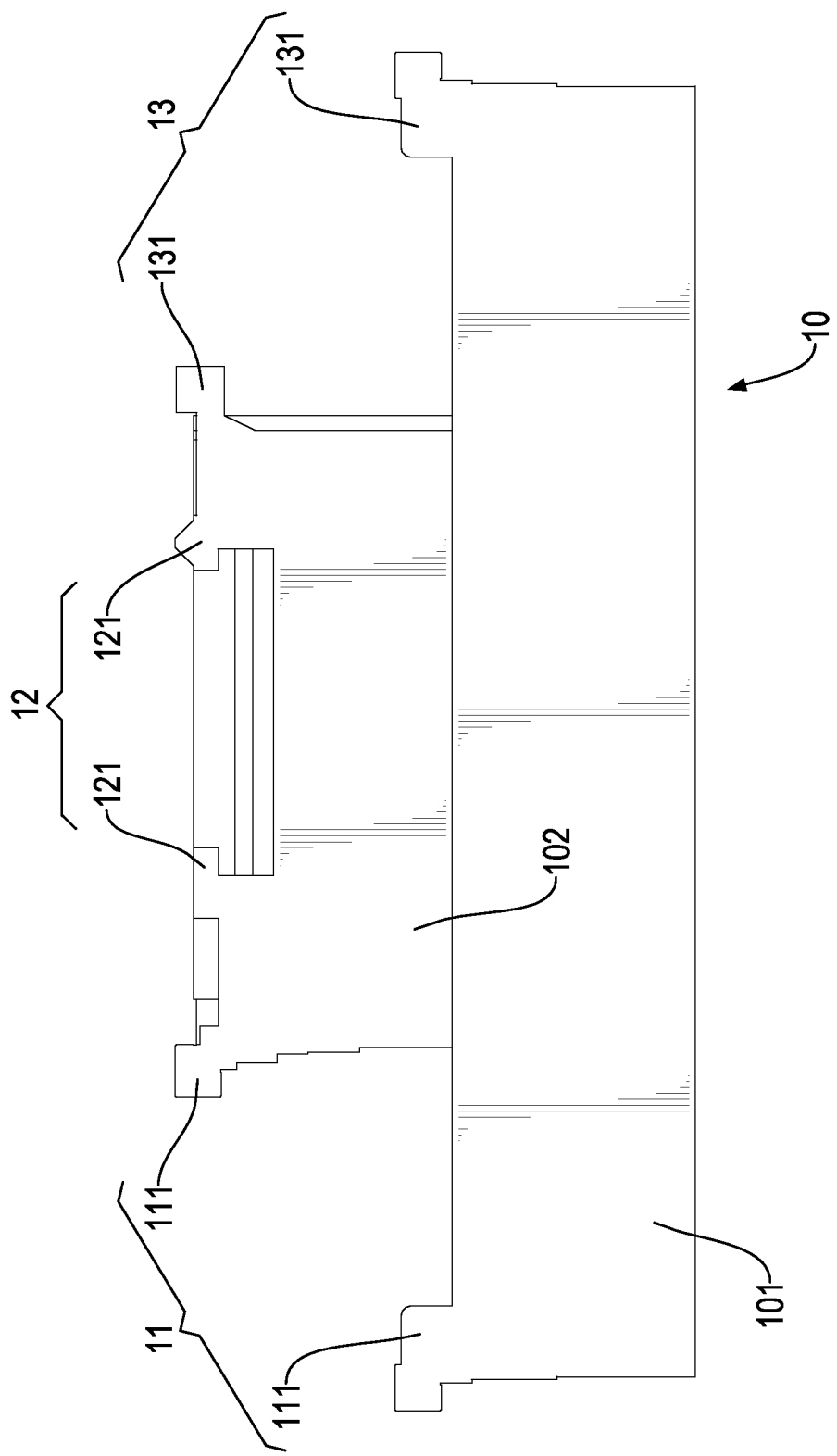
FIG. 8 is a right side view of the bed of the complex machine tool for cylindrical workpieces in FIG. 7.

With reference to FIG. 8, in the preferred embodiment of the present invention, the bed 10 has a base 101 having a top surface and a platform 102. The platform 102 is disposed on the base 101, and has a top surface located higher than a top surface of the base 101. Further, the two rails 121 of the second track 12 are parallelly located on the top surface of the platform 102. With reference to FIG. 8, one of the two rails 111 of the first track 11 is integrally formed on a left edge of the top surface of the base 101, and the other rail 111 of the first track 11 is integrally formed on a left edge of the top surface of the platform 102. One of the two rails 131 of the third track 13 is integrally formed on a right edge of the top surface of the base 11, and the other rail 131 of the third track 13 is integrally formed on a right edge of the top surface of the platform 102. As a result, the two rails 111 of the first track 11 form a height difference therebetween and the two rails 131 of the third track 13 form a height difference therebetween. This technical feature helps to reduce Abbe error, i.e., if a shift distance between a driving axle and a moving axle of a component on one of the tracks 11, 12, 13 is larger, an error in machining precision becomes larger.

In other words, each one of the three tracks 11, 12, 13 has two respective said rails 111, 121, 131. The two rails 111 of the first track 11 form said height difference therebetween, the two rails 131 of the third track 13 form said height difference therebetween, and the two rails 121 of the second track 12 are at least located higher than a lower one of the two rails 111 of the first track 11 and a lower one of the two rails 131 of the third track 13.

Figure 9:
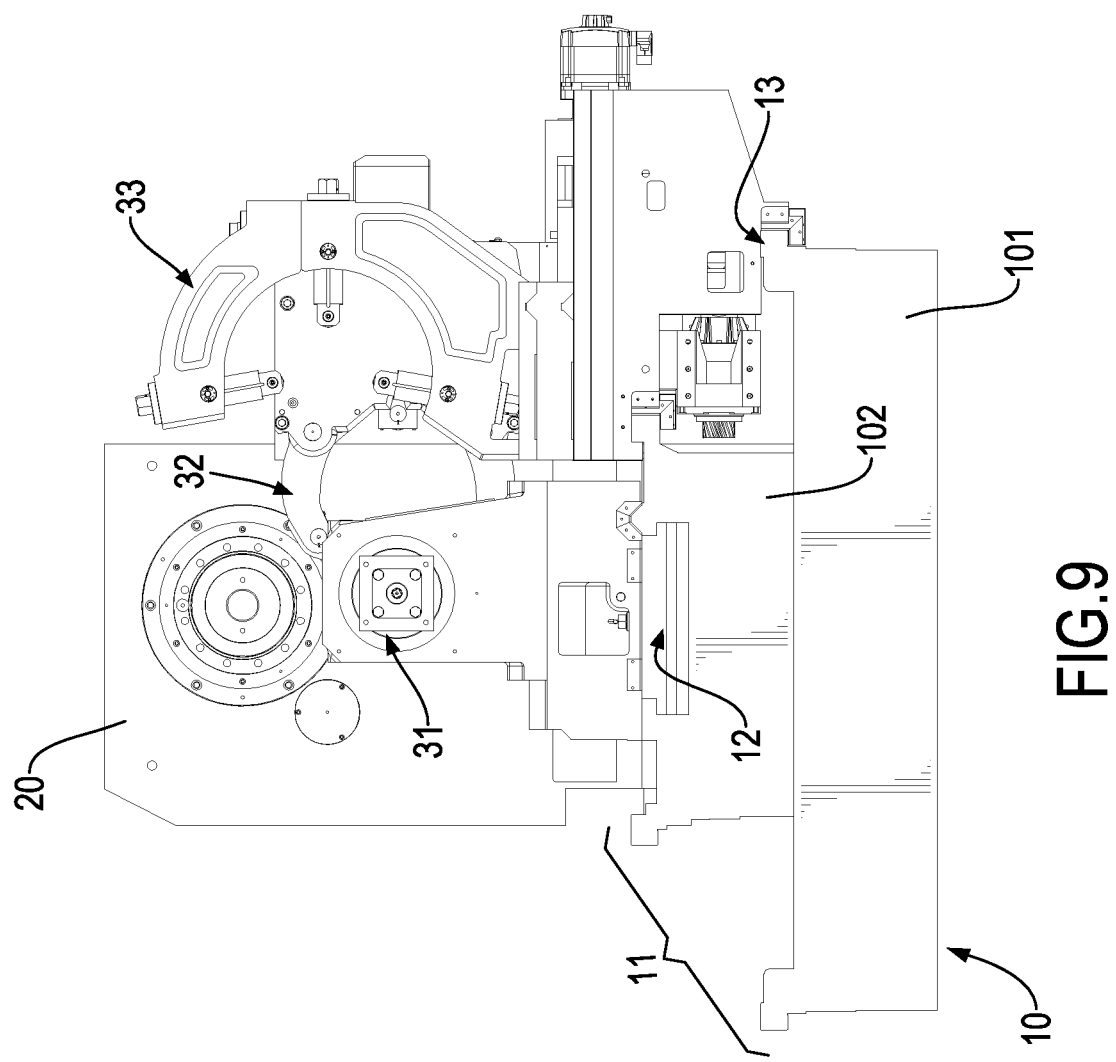
FIGS. 9 to 11 are other operational side views of the complex machine tool for cylindrical workpieces in FIG. 1.

Moreover, the technical features of the height differences between the two rails 111 of the first track 11 and the two rails 131 of the third track 13 are contributive to reduce an overall width of the complex machine tool for cylindrical workpieces. With reference to FIG. 9, a horizontal length from left to right is shortened, and spatial efficiency in a factory may be improved.

In other embodiments, the bed 10 may be integrally casted. Alternatively, each one of the three tracks 11, 12, 13 is integrally formed on a respective structural unit, and the three structural units are assembled with each other afterwards to form the bed 10. Optionally, two of the three tracks 11, 12, 13 (e.g. the first track 11 and the second track 12, or the second track 12 and the third track 13) may be jointly formed on a structural unit, and the rest track (the third track 13 or the first track 11) is formed on another structural unit. The two structural units are afterwards assembled to form the bed 10.

What needs particular explanation is that the three tracks 11, 12, 13 may also be formed on a horizontal plane. Nevertheless, intervals between the three tracks 11, 12, 13 in this configuration must be larger than intervals between the three tracks 11, 12, 13 of the preferred embodiment of the present invention.

With reference to FIGS. 2, 3, 5, and 6, the headstock assembly 20 is connected to the bed 10, is located near one of two ends of the second track 12, and is configured for holding a cylindrical workpiece. In the present invention, the headstock assembly 20 is mounted on the platform 102.

In the preferred embodiment of the present invention, with reference to FIGS. 3 to 6, the three supporting assemblies 30 are respectively a first supporting assembly 31, a second supporting assembly 32, and a third supporting assembly 33. The first supporting assembly 31 is mounted on the second track 12, and is slidable along the guiding direction D2 of the second track 12. Furthermore, the first supporting assembly 31 is a tailstock assembly, which may slide on the second track 12 according to a length of the cylindrical workpiece, and may support the cylindrical workpiece with a tailstock quill or a holding mechanism.

The second supporting assembly 32 is slidably mounted on the two rails 131 of the third track 13, and is movable along the guiding direction D3 of the third track 13. The second supporting assembly 32 is a hydraulic steady rest having two arms 321 and forming a C-shaped structure. The two arms 321 extend above the second track 12, and clamp the cylindrical workpiece to provide support on a middle portion of the cylindrical workpiece.

The third supporting assembly 33 is also slidably mounted on the two rails 131 of the third track 13, and is movable along the guiding direction D3 of the third track 13. The third supporting assembly 33 is a manual steady rest which has a C-shaped configuration, extends above the second track 12, and clamps a middle portion of the cylindrical workpiece to provide support.

The first supporting assembly 31 and the second supporting assembly 32 are merely examples of said supporting assemblies 30. In other embodiments, the complex machine tool for cylindrical workpieces in accordance with the present invention may be equipped without the tailstock assembly. Instead the complex machine tool may be equipped with multiple C-shaped second supporting assemblies 32 to clamp different positions of the workpiece along with the headstock assembly 20. Besides, said second supporting assembly 32 may also be mounted on the first track 11 or the second track 12 depending on demands.

Moreover, in the preferred embodiment of the present invention, the two machining assemblies 40 are respectively a first machining assembly 41 and a second machining assembly 42. The first machining assembly 41 is slidably mounted on the two rails 111 of the first track 11, and is movable along the guiding direction D1 of the first track 11. The first machining assembly 41 is a turning assembly which can process turning on the cylindrical workpiece. Further, the first machining assembly 41 has a turning tool magazine 411, so turning tools may be substituted. Technical features and a method for changing the turning tools are same as the prior art, so detailed descriptions are omitted.

The second machining assembly 42 is slidably mounted on the two rails 111 of the first track 11, and is movable along the guiding direction D1 of the first track 11. The second machining assembly 42 is a milling assembly which can process milling on the cylindrical workpiece. Besides, the first machining assembly 41 or the second machining assembly 42 can also be a grinder in other embodiments, wherein the grinder can process grinding on the cylindrical workpiece.

Positions of the first machining assembly 41 and the second machining assembly 42 may be exchanged, and another said machining assembly 40 may be mounted on the second track 12. For instance, if the complex machine tool for cylindrical workpieces are equipped without a tailstock assembly, the complex machine tool may comprise a boring machine serving as said machining assembly 40. To briefly conclude, the complex machine tool of the present invention may solely finish turning, milling, grinding, and boring processes.

Each one of the supporting assemblies 30 and each one of the machining assemblies 40 are all removable from the bed 10. Hence, a user may increase or replace suitable sorts of the supporting assemblies 30 and sorts of machining assemblies 40 as needed, or the user may reduce the number of the supporting assemblies 30 and the machining assemblies 40 to avoid interferences of movements.

Figure 3:
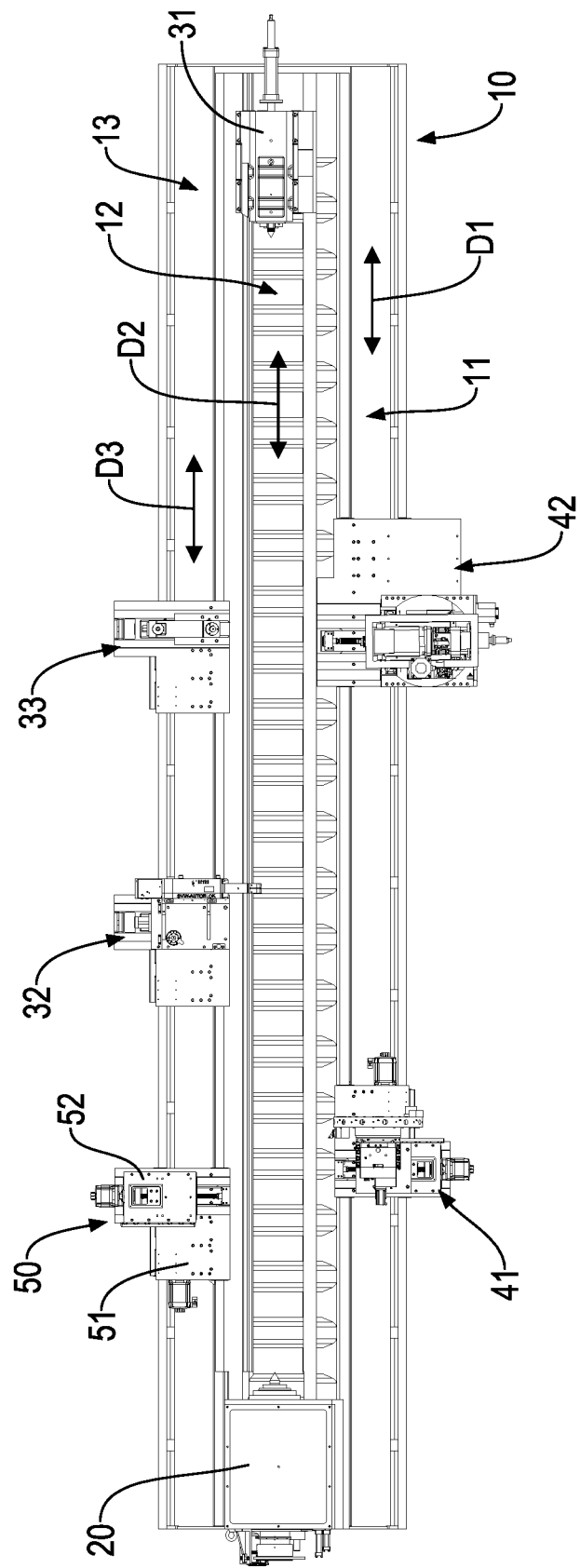
FIG. 3 is a top side view of the complex machine tool for cylindrical workpieces in FIG. 1.
Figure 4:
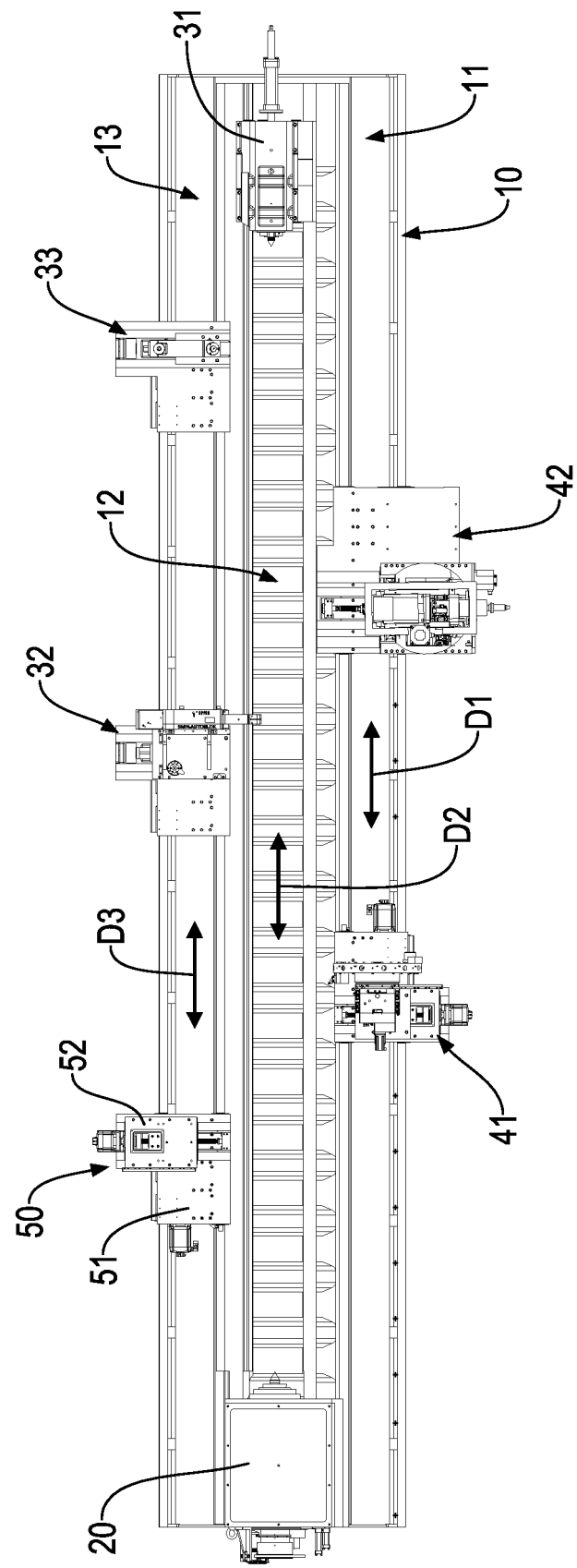
FIG. 4 shows an operational top view of the complex machine tool for cylindrical workpieces in FIG. 1 after movements of supporting assemblies and machining assemblies of the complex machine tool.

With reference to FIGS. 1 and 3, the carriage 50 has a sliding base 51 and a cross slide 52. The sliding base 51 is slidably mounted on the two rails 131 of the third track 13, and is moveable along the guiding direction D3 of the third track 13. The cross slide 52 is slidably mounted on the sliding base 51, and is moveable along a direction perpendicular to the guiding direction D3 of the third track 13. Tools are mounted to the cross slide 52 for either machining the cylindrical workpiece or supporting the cylindrical workpiece. For example, in the preferred embodiment of the present invention, each one of the second supporting assembly 32, the third supporting assembly 33, and the two machining assemblies 40 comprises said sliding base 51 and said cross slide 52 so as to move in two directions on a horizontal plane.

Figure 5:
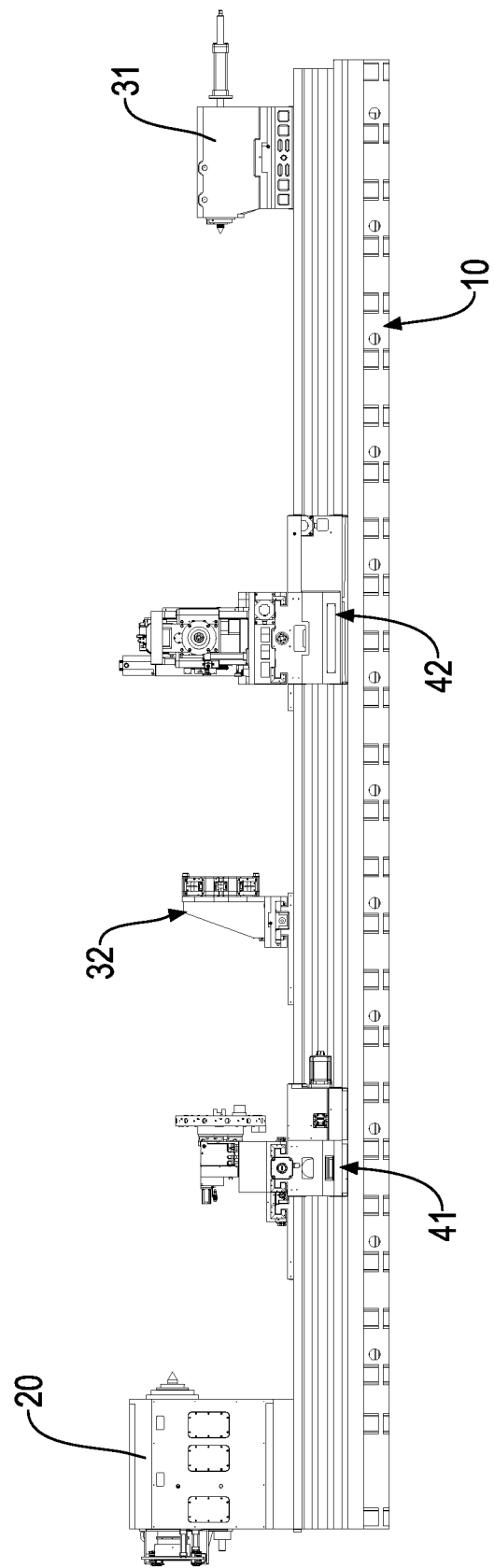
FIG. 5 is a front side view of the complex machine tool for cylindrical workpieces in FIG. 1.
Figure 6:
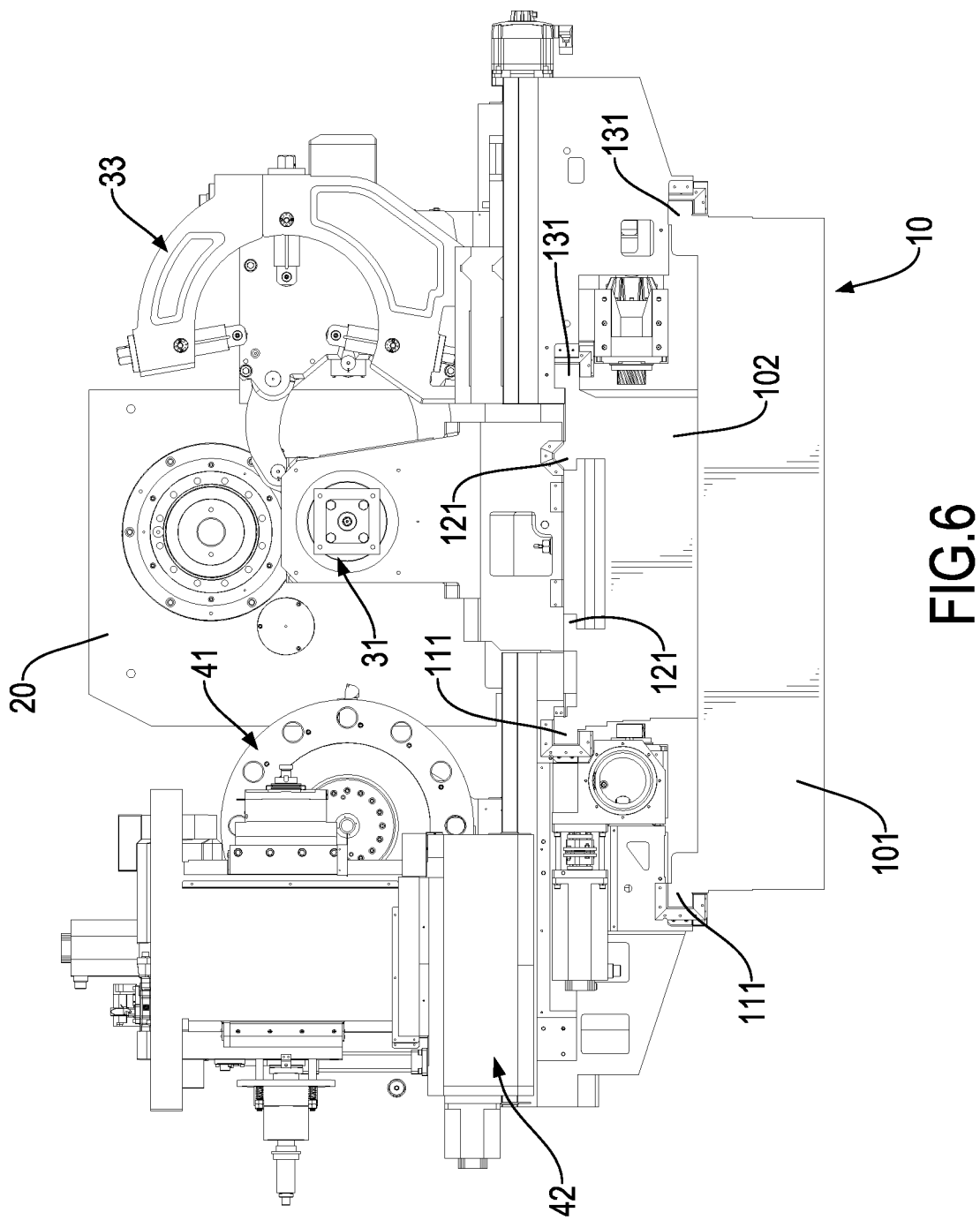
FIG. 6 is a right side view of the complex machine tool for cylindrical workpieces in FIG. 1.
Figure 7:
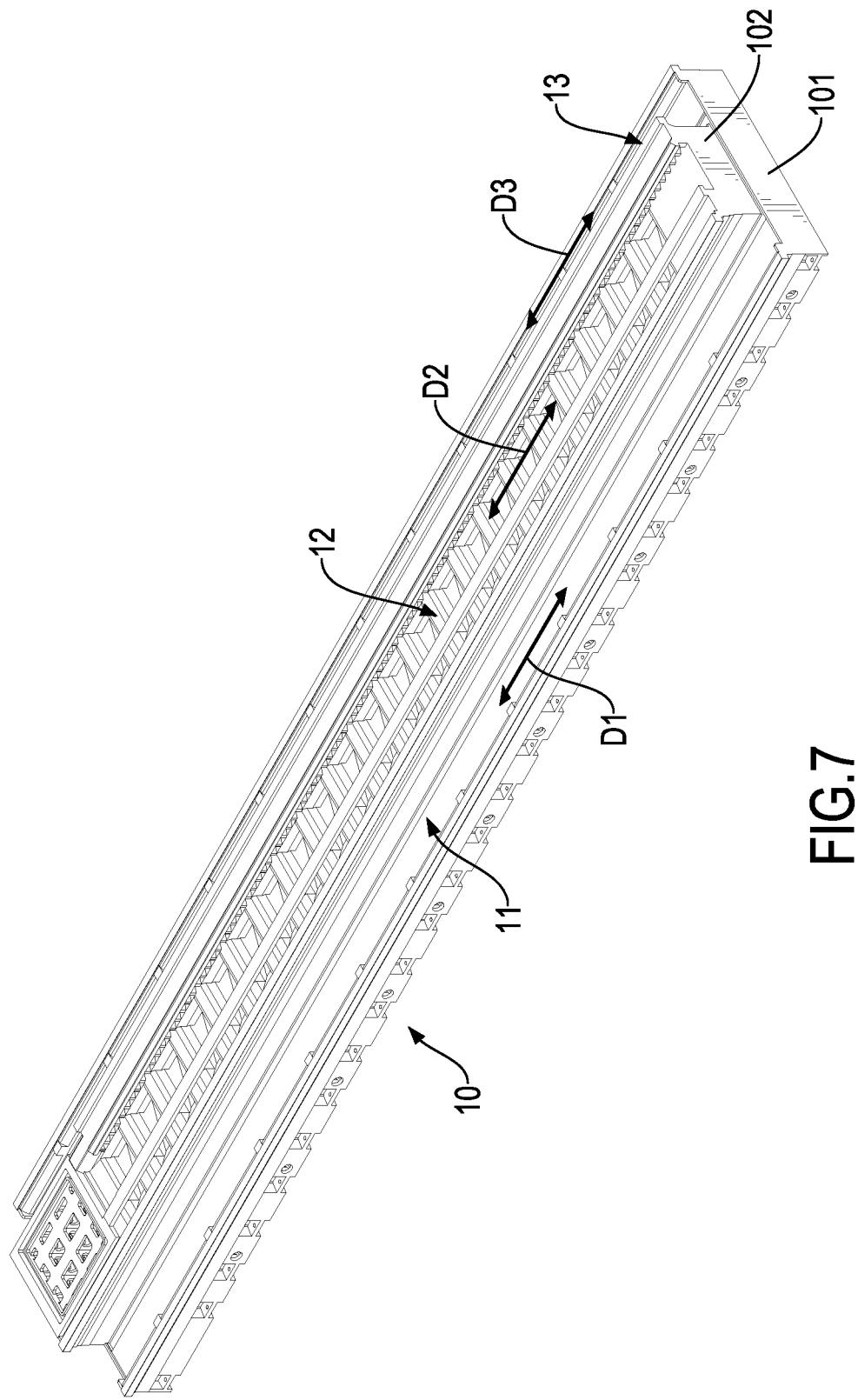
FIG. 7 is a perspective view of a bed of the complex machine tool for cylindrical workpieces in FIG. 1.
Figure 10:
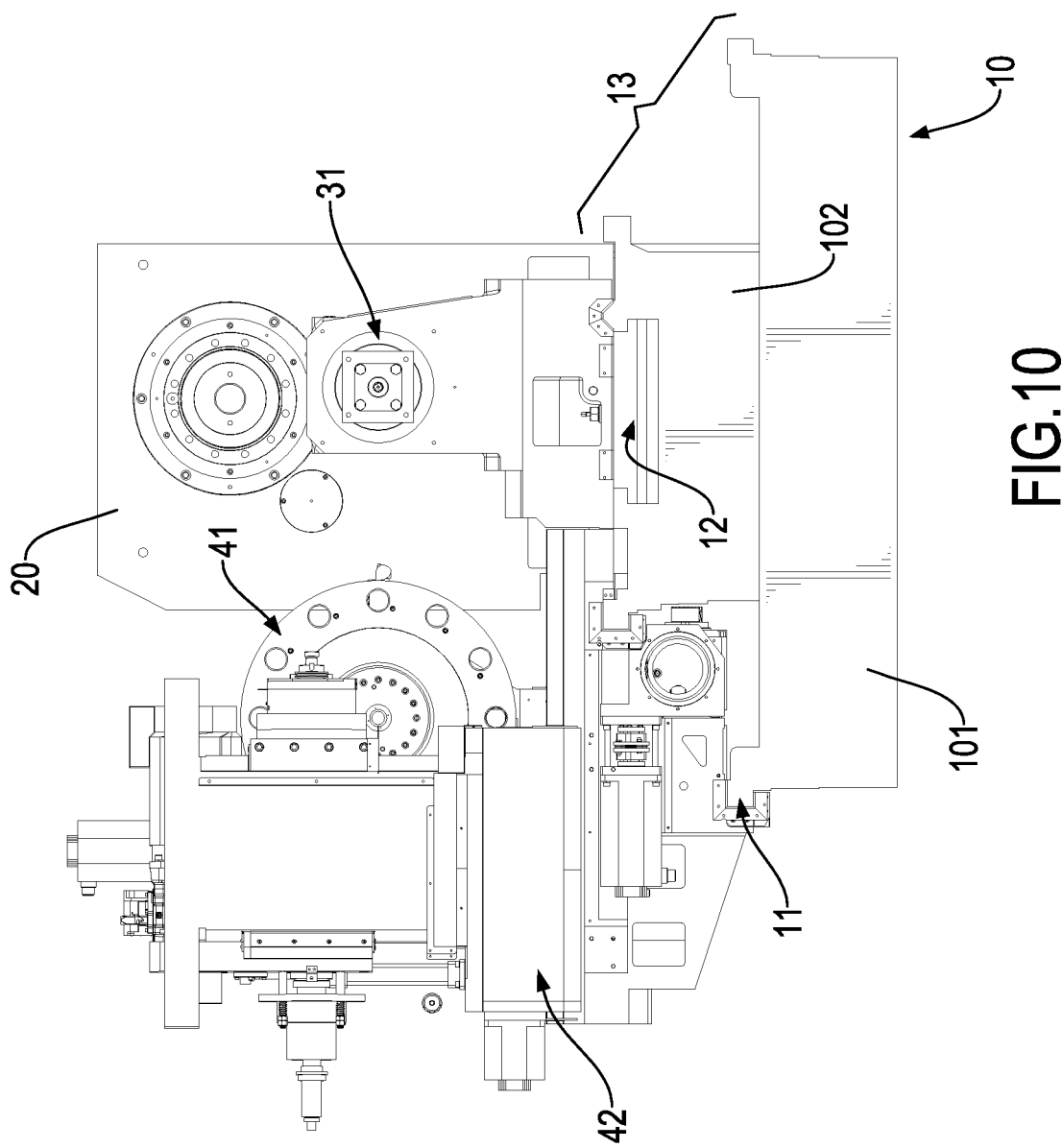
Figure 11:
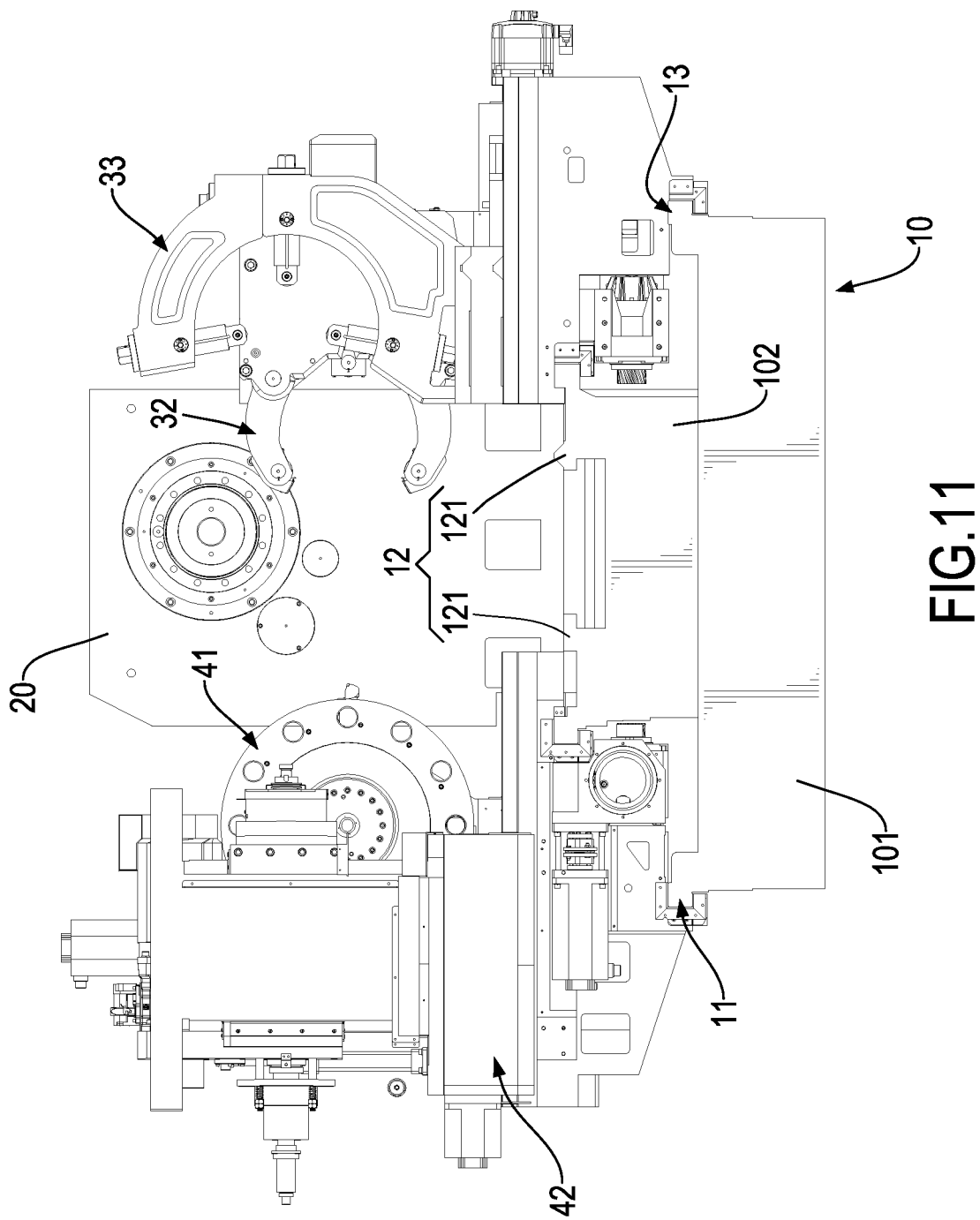

With reference to FIGS. 9 to 11, the user can take advantages of the three tracks 11, 12, 13 diversely upon demands. For example, as shown in FIG. 9, only the second track 12 and the third track 13 are used; as shown in FIG. 10, only the first track 11 and the second track 12 are used; as shown in FIG. 11, only the first track 11 and the third track 13 are used. And of course, as shown in FIGS. 3, 5, and 6, all of the first track 11, the second track 12, and the third track 13 are simultaneously used.

In the preferred embodiment, the second supporting assembly 32 and the third supporting assembly 33 are both mounted on the third track 13, and the first machining assembly 41 and the second machining assembly 42 are both mounted on the first track 11. However, one of the machining assemblies 40 may be located beside each one of the supporting assemblies 30 in practice, and vice versa.

According to the above-mentioned technical features, through the three tracks 11, 12, 13 of the bed 10, different supporting assemblies 30 and different machining assemblies 40 may be mounted on an appropriate one of the three tracks 11, 12, 13, so the present invention may be applied for demand on multiple machining processes. Further, such configuration effectively avoids the problem of interference which is caused by multiple machining assemblies mounted on the way of the conventional complex machine tool. Also, because the complex machine tool may solely complete multiple different machining processes, and the cylindrical workpiece need not be shifted to different complex machine tools, thus the number of machines in a factory may be reduced, spatial efficiency may be improved, and propagation of errors may be further avoided.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

DESCRIPTION OF NUMERICAL CHARACTERS

10: bed
101: base
102: platform
11: first track
12: second track
13: third track
111, 121, 131: rail
20: headstock assembly
30: supporting assembly
31: first supporting assembly
32: second supporting assembly
321: arm
33: third supporting assembly
40: machining assembly
41: first machining assembly
411: turning tool magazine
42: second machining assembly
50: carriage
51: sliding base
52: cross slide
D1, D2, D3: guiding direction

What is claimed is:
1. A machine tool for cylindrical workpieces, the machine tool comprising:
 a bed having;
  three tracks being respectively a first track, a second track, a third track in serial order, wherein the second track is located between the first track and the third track, each one of the three tracks defines a respective guiding direction, and the three guiding directions of the three tracks are mutually parallel, each one of the three tracks has a respective two rails, wherein the two rails of the first track form a height difference therebetween, the two rails of the third track form a height difference therebetween, and the two rails of the second track are located at least higher than a lower one of the two rails of the first track and a lower one of the two rails of the third track;
  a base;
  a platform disposed on the base, wherein a top surface of the platform is located higher than a top surface of the base;
 the machine further comprising:
 a headstock assembly connected to the bed, located at one of two ends of the second track, and configured for holding a cylindrical workpiece;
 at least one supporting assembly mounted on one of the first track, the second track, and the third track, and configured for supporting the cylindrical workpiece; and at least one machining assembly mounted on one of the first track, the second track, and the third track, and the at least one machining assembly being slidable along the track on which the at least one machining assembly is mounted, and located at a spaced interval from the at least one supporting assembly;

wherein the two rails of the second track are located on the top surface of the platform;

wherein the two rails of the first track are respectively located on the top surface of the base and the top surface of the platform; and wherein the third track is located on a side of the second track away from a side of the second track at which the first track is located, and the two rails of the third track are respectively located on the top surface of the base and the top surface of the platform.

2. The machine tool for cylindrical workpieces as claimed in claim 1, wherein said at least one supporting assembly is one of a tailstock assembly and a C-shaped steady rest.

3. The machine tool for cylindrical workpieces as claimed in claim 1, wherein said at least one machining assembly is one of a turning assembly and a milling assembly.

4. The machine tool for cylindrical workpieces as claimed in claim 3, wherein said supporting assembly is one of a tailstock assembly and a C-shaped steady rest.

* * * * *